Aug. 29, 1967  E. A. ANDERSON ET AL  3,337,946
METHOD OF MOUNTING FASTENERS

Filed March 19, 1963  2 Sheets-Sheet 1

INVENTORS
EDWARD A. ANDERSON
BY WARREN E. BEUTLER
*Williams, David,
Hoffmann & Yount*
ATTORNEYS Aug. 29, 1967     E. A. ANDERSON ET AL     3,337,946

METHOD OF MOUNTING FASTENERS

Filed March 19, 1963     2 Sheets-Sheet 2

INVENTORS
EDWARD A. ANDERSON
WARREN E. BEUTLER
BY Williams, David,
Hoffmann & Yount.
ATTORNEYS United States Patent Office 3,337,946
Patented Aug. 29, 1967

3,337,946
METHOD OF MOUNTING FASTENERS
Edward A. Anderson, Cleveland Heights, and Warren E. Bentler, Willoughby, Ohio, assignors to The Lamson & Sessions Co., Cleveland, Ohio, a corporation of Ohio
Filed Mar. 19, 1963, Ser. No. 266,256
9 Claims. (Cl. 29—432.1)

This invention relates to fasteners of the kind permanently mounted on a support plate or the like and, more particularly, to a novel method of mounting such a fastening member.

For various fastening purposes and locations it is desirable to have a nut or the like mounted on a metal plate so that a screw can be more easily engaged and quickly tightened in the threaded opening of the nut. Mounting of the nut on the plate has heretofore generally been accomplished either by clinching or by welding. These procedures involve additional handling steps and additional equipment and therefore result in increased cost.

As one of its objects, the present invention provides a novel method for mounting a fastener member, such as a nut, on a support plate in which the opening needed in the plate is pierced by a projection on the nut and the projection is caused to be gripped by the pierced plate portion, the piercing and gripping being accomplished in one and the same nut mounting operation.

Another object is to provide such a novel mounting method for a nut or the like in which the pierced plate portion includes a flange surrounding the pierced opening and the gripping of the nut projection is produced by deflecting or contracting the flange-carrying portion toward and around the projection.

Still another object is to provide a novel nut mounting method in which a portion of the plate is deflected in one direction to form a bulge on one side thereof and is pierced centrally of the bulge by the projection of the nut and, as a part of the same operation, the pierced plate portion is deflected in the opposite direction to form a bulge on the other side of the plate which is caused to grip the nut projection.

A further object is to provide such a novel nut mounting method in which the piercing of the first-formed bulge is carried out so as to leave a flange thereon surrounding the pierced opening and, by altering the position of the flange when the second bulge is formed, the flange is caused to grip the nut projection.

Yet another object is to provide a novel nut mounting method as hereinabove referred to wherein the nut has a recess and a convergently inclined wall around the projection and which wall is wedgingly effective on the second-formed bulge to cause the flange of the plate to grip the nut projection.

Additionally, this invention provides a novel fastener assembly comprising a plate member or the like as a support, and a nut member secured thereon by a gripping engagement of a flanged portion of the plate member with a stem projection of the nut.

Figure 1:
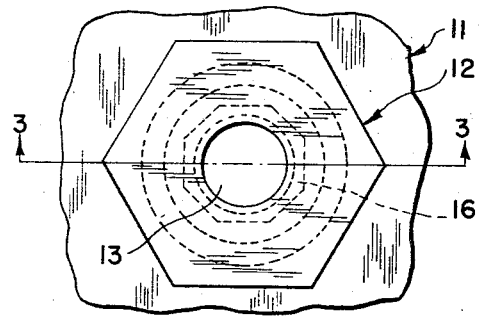
FIG. 1 is a plan view showing a novel fastener assembly produced by the novel method of this invention and comprising a nut mounted on a plate member.
Figure 2:
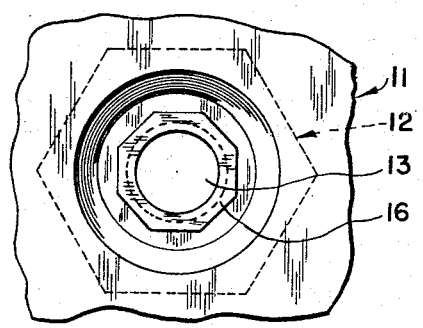
FIG. 2 is a bottom plan view of the same fastener assembly.
Figure 3:
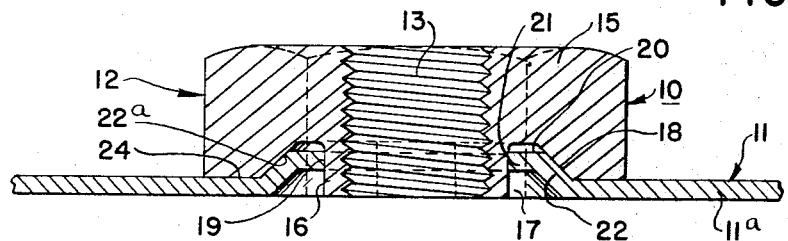
FIG. 3 is a larger-scale sectional view taken through the assembly on section line 3—3 of FIG. 1.

The novel fastener assembly 10 of this invention is shown in FIGS. 1, 2 and 3 and will be described first, and the novel method for producing such a fastener assembly will be described later.

The fastener assembly 10 comprises a support, which is here shown as being a plate member 11, and a fastener member secured thereon and here shown as being a nut 12 having a threaded opening 13.

The nut 12 comprises a metal body 15, in this case, a body of a hexagonal shape having a stem-like projection 16 on one side thereof in a coaxial relation to the threaded opening 13. The nut body 15 also has a recess surrounding the stem projection 16, in this case, an annular groove 17 having an annular side wall 18 spaced from the projection 16 and inclined in a converging relation for a direction of movement into the groove.

The plate 11 has a pierced or sheared opening 19 in which the nut projection 16 is received, and an annular flange 20 surrounding the pierced opening and having a free edge portion 21 in girpping engagement with the perimeter of the nut projection. The nut 12 is secured on the plate 11 by this gripping engagement of the flange 20 with the projection 16. To describe the manner in which the gripping of the nut projection 16 by the flange 20 is achieved, it is explained that plate 11 has a deflected portion or bulge 22 which projects from the same side of the plate as that on which the nut 12 is located. The bulge 22 supports the flange 20 and connects the same in an integral relation with the main flat portion 11a of the plate. When the mounting of the nut 12 on the plate 11 is completed, the inclined annular wall 18 of the groove 17 is in deflecting or wedging engagement with the inclined outer perimeter 22a of the bulge 22 and presses and holds the edge portion 21 of the flange 20 in the gripping engagement with the nut projection 16. The portion of the nut laterally outward of and surrounding the groove 17 has a flat bottom surface 24 and, at the completion of the mounting operation, this bottom surface engages or lies adjacent to the surface of the main flat portion 11a of the plate.

The nut projection 16 can be of any desired shape externally thereof, but preferably, has a polygonal shape such as the octagonal shape shown in the drawings. The pierced opening 19 is of a size and shape to correspond with the size and shape of the pojection 16 and is here shown as also being octagonal so that the sides and corners of the polygonal shape will resist rotation of the projection 16 in the pierced opening and thus prevent turning of the nut 12 relative to the plate 11 when a screw or the like is engaged in the threaded opening 13.

Figure 4:
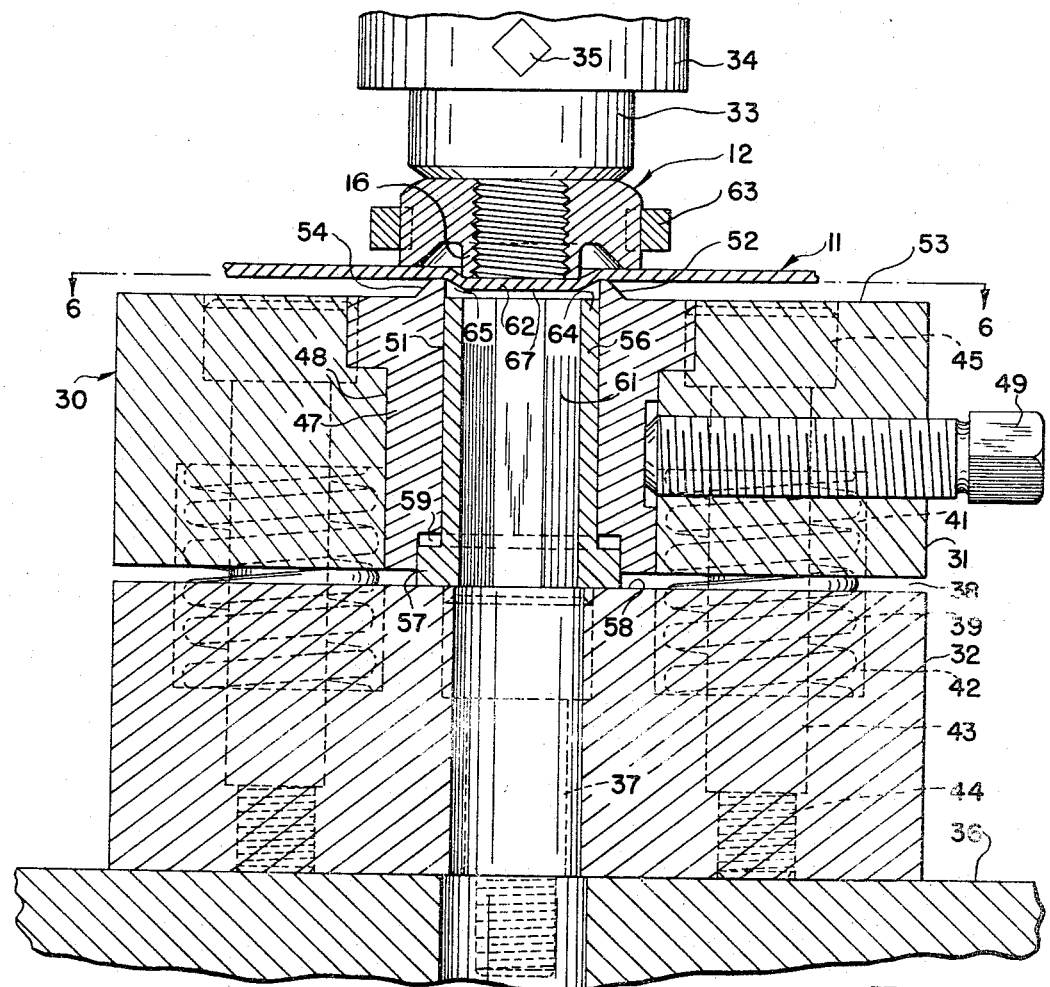
FIG. 4 is a vertical axial section taken through die apparatus usable in the novel method and illustrating a portion of the nut mounting procedure.
Figure 5:
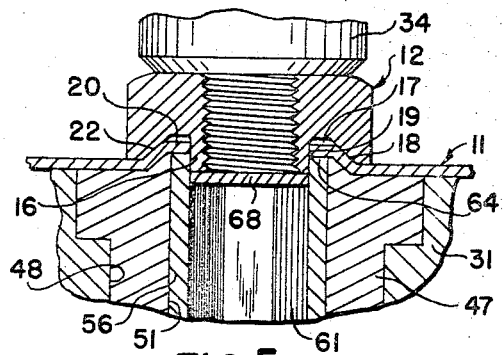
FIG. 5 is a fragmentary axial section showing another position of the die apparatus and a different portion of portion of the nut mounting procedure.
Figure 6:
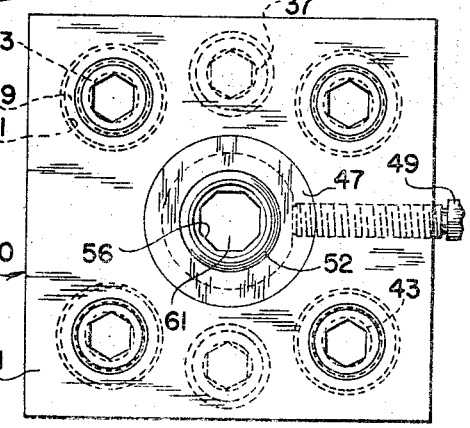
FIG. 6 shows the lower portion of the die apparatus when viewed in plan as indicated by the line 6—6 of FIG. 4.

FIGS. 4, 5 and 6 of the drawings show die apparatus 30 which is usable in the novel method and which die apparatus will be described next. As shown in FIG. 4 of the drawings, the die apparatus 30 comprises a pair of die blocks 31 and 32 which form the lower portion of the apparatus, and a punch member 33 carried by a reciprocable ram or the like 34 and movable thereby toward and away from the upper die block 31. The punch member 33 is secured in the ram 34 as by means of a set screw 35.

The lower die block 32 is supported by a platen 36 and is secured thereon as by means of suitable hold down screws 37. The upper die block 31 is vertically movable toward and away from the lower die block 32 for a purpose to be explained hereinafter, and the closing movement between the die blocks is permitted by the intervening space 38.

The opening movement between the die blocks 31 and 32 is a lifting movement imparted to the upper die block 31 and is produced by compression springs 39 disposed between the blocks. The springs 39 have their opposite ends received in spring pockets 41 and 42 of the upper and lower die blocks 31 and 32 and are disposed around retainer studs 43 which extend through these spring pockets. The studs 43 have lower ends engaged in threaded openings 44 of the lower die block 32 and, at the upper end thereof, have heads 45 recessed into the upper die block 31 and which act as abutment stops for limiting the distance to which the upper block is moved away from the lower block by the expansive action of the springs 39.

The die apparatus 30 also comprises a hollow die insert member 47 mounted in the upper die block 31 by being received in a counterbored opening 48 of the latter and which insert member is retained in the counterbored opening by a set screw 49. The insert member 48 has a cylindrical central guide passage 51 extending therethrough and, on the top thereof, is provided with an annular die projection 52 around the guide passage. The top of the upper die block 31 surrounding the counterbore in which the insert member 48 is disposed provides a flat support surface 53 and the portion of the insert member surrounding the die projection 52 is substantially flush with and forms a part of this support surface.

The die projection 52 is of a diameter to be receivable in the annular groove 17 of the nut 12 during the performance of the method by which the nut is mounted on the plate 11. As shown in FIGS. 4 and 5, the die projection 52 has an inclined annular thrust surface 54 on the outward lateral side thereof. The angle and direction of inclination of this thrust surface are generally similar to the angle and direction of inclination of the inclined annular wall 18 of the nut 12.

The die apparatus 30 also includes a die sleeve 56 which is relatively slidable in the guide passage 51 of the die insert member 47. The lower end of the die sleeve 56 is provided with an enlargement or head 57 which is seated on the central portion of the top surface 58 of the lower die block 32. The upper die block 31 is provided in the underside thereof with a counterbore 59 which receives the head 57 when the upper block is moved toward the lower block 32 in opposition to the springs 39.

The die sleeve 56 has an axial passage 61 of a size and cross-sectional shape corresponding with the size and cross-sectional shape of the stem projection 16 of the nut 12. The size of the passage 61 is slightly larger than the projection 16 so that the projection will be movable therein in a shearing relation to the upper end of the die sleeve 56 for piercing the plate 11 in the manner to be presently explained.

In producing the fastener assembly 10, the plate 11 is first placed over the upper die block 31 so that an initially imperforate portion or area 62 of the plate will overlie the upper end of the die sleeve passage 61 when the plate member is resting on the die projection 52. At this time the punch member 33 is supported in an elevated position by the ram 34. The nut 12 to be mounted on the plate 11 is then moved to a position immediately below the punch 33 as by means of suitable feed fingers 63. When the feed fingers 63 release the nut 12, the lower end of the stem projection 16 rests on the imperforate area portion 62 of the plate.

The die sleeve 56 is of a length such that when the upper die block 31 is in its normally-spread relation to the lower die block 32 as shown in FIG. 4, the upper end 64 will be spaced below the top of the projection 54 a distance comparable with the height dimension of this projection. Because of this initially retracted position of the die sleeve 56, a space 65 will exist between the underside of the plate 11 and the upper end of the die sleeve. When the nut 12 is in its mounting position on the plate 11 as just decribed above, the groove 17 of the nut will be located in alignment with and above the die projection 52 as can be seen in FIG. 4.

Assuming that the nut 12 is on the plate 11 in the position described above, the mounting method is carried out by moving the punch 33 downward against the top of the nut which causes the free end of the nut projection 16 to apply thrust to the imperforate area portion 62 of the plate and to deflect or bulge such plate portion into the space 65. FIG. 4 of the drawings shows the condition of the die apparatus 30 and the bulged condition of the plate 11 at this point of the method procedure.

The resulting bulged portion 67 projects from the side of the plate 11 opposite from the nut 12 and, upon further movement of the nut in the same direction by the punch member 33, thrust applied against the die projection 52 through the plate will move the upper die block 31 in a closing direction relative to the lower die block 32. The closing movement of the upper die block 31 causes a relative sliding movement of the die sleeve 56 in the guide passage 51.

Figure 7:
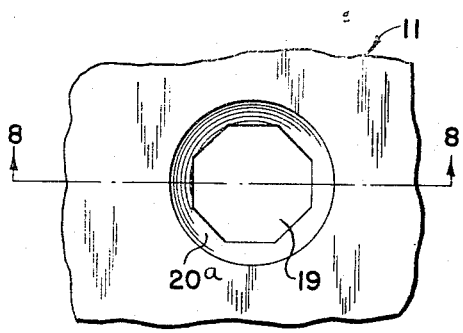
FIG. 7 is a fragmentary plan view of the plate after piercing of the first-formed bulge and showing an inclined flange remaining around the pierced opening.
Figure 8:
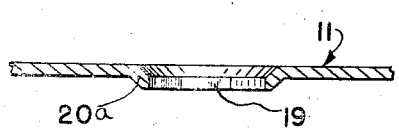
FIG. 8 is a cross-section taken on line 8—8 of FIG. 7.

A continued downward movement of the nut 12 accompanied by a simultaneous upward relative movement of the die sleeve 56, causes the nut projection 16 to enter the passage 61 by first piercing the imperforate area portion 62 of the plate 11. In thus piercing the plate portion 62, the nut projection 16 displaces a sheared slug 68 (see FIG. 5) therefrom into the passage 61 of the die sleeve. The piercing of the plate portion 62 by the nut projection 16 forms the above-described opening 19 in the plate 11. Since the transverse outer dimension of the nut projection 16 is smaller than the internal diameter of the guide passage 51, a portion of the bulge 67 will remain on the plate as an inclined annular flange 20ª surrounding the pierced opening 19 as shown in FIGS. 7 and 8. The inclined flange 20ª later becomes the above-described gripping flange 20.

Following the piercing of the plate portion 62 by the nut projection 16, the downward movement of the nut 12 is continued and causes further upward relative movement of the die sleeve 56 to bring the upper end 64 thereof to an elevation flush with, or nearly the same as that of, the top of the die projection 52. The continued downward movement of the nut 12 by the punch member 33 also causes a relative movement of the die projection 52 into the groove 17 whereby the plate portion carrying the inclined flange 20ª is deflected in the opposite direction to form the above-mentioned bulge 22. Since this deflection of the flange-carrying portion of the plate 11 is produced during the further downward movement of the nut 12, the resulting bulge 22 will be formed by pushing the flange-carrying portion into the groove 17.

Continued downward movement of the nut 16 will bring the inclined groove side wall 18 into wedging engagement with the inclined outer wall 22ª of the bulge 22. While the flange-carrying portion is being thus deflected into the groove 17 to form the bulge 22 on the opposite side of the plate 11, the flange 20ª will be repositioned by being carried into the groove to substantially the location shown in FIGS. 3 and 5, in which it surrounds the projection 16 at a point relatively close to the base thereof.

The wedging engagement of the inclined wall 18 of the nut with the inclined surface 22ª of the bulge 22 deflects or contracts the bulge toward and around the nut projection 16 thereby causing the free edge portion 21 of the flange (see FIGS. 3 and 5) to grip the nut projection for securing the nut on the plate 11. When the nut projection 16 has the noncircular or polygonal shape described above and the pierced opening 19 has a corresponding polygonal shape, the sides and corners of the polygonal shape will result in the nut 12 being strongly held against rotation when a screw or the like is engaged in the threaded opening 13.

FIGS. 7 and 8 of the drawings show the approximate condition and shape of the first-formed bulge 67 of the plate 11 immediately after the piercing of the opening 19 therein. FIGS. 7 and 8 also show the shape and location of the flange 20ª which is left on the first-formed bulge 67 when the slug 68 is pierced therefrom.

Figure 9:
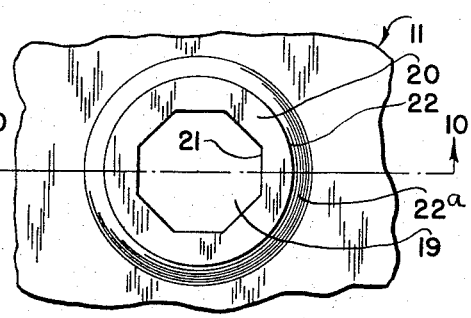
FIG. 9 is a fragmentary plan view showing the shape of the second-formed bulge of the plate member.
Figure 10:
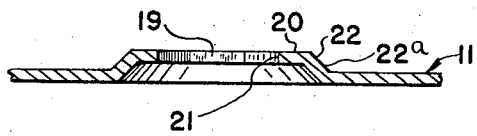
FIG. 10 is a cross-section taken on line 10—10 of FIG. 9.

FIGS. 9 and 10 show the approximate shape and condition of the portion of the plate 11 which comprises the second-formed bulge 22 when the flange-carrying portion of the plate is deflected into the groove 17 of the nut 12.

From the accompanying drawings and the foregoing detailed description it will now be readily understood that this invention provides a novel method for mounting a fastening member on a plate or the like, and also provides a novel plate and fastener member assembly produced by such method. It will now also be recognized that this invention provides a simple method and fastener assembly in which a projection on a nut or the like is used to pierce the plate on which the nut is to be mounted and that, by a continuation of the piercing operation, a flange-carrying portion of the plate is deflected and caused to grip the nut projection for securing the nut on the plate.

Additionally, it will now be understood that, whereas the mounting of a nut on a plate by the clinching or welding operations heretofore used required additional handling and special apparatus, the present invention provides for directly mounting the nut on the plate by merely causing a projection of the nut to pierce the necessary opening in the plate and to be thereupon gripped by the pierced portion for securing the nut thereon. The novel method herein disclosed accordingly provides for more rapid and economical mounting of nut members on plate members, and also results in a novel fastener assembly in which the nut member is securely connected to its associated plate member.

Although the method and the fastener assembly of this invention have been illustrated and described herein to a somewhat detailed extent, it will be understood, of course, that the invention is not to be regarded as being correspondingly limited in scope but includes all changes and modifications coming within the terms of the claims hereof.

Having described our invention, we claim:

1. The method of mounting a nut, of the kind carrying a stem projection surrounded by a groove, on a plate; comprising the steps of moving the nut toward said plate and engaging said stem against one side thereof; deflecting the engaged plate portion to form a bulge on the opposite side of the plate; continuing the movement of said nut in the same direction and piercing an opening in said bulge centrally thereof by said stem projection while leaving a portion of said bulge as a flange around the pierced opening; deflecting the flange-carrying portion of said plate in the opposite direction and into said groove as a second bulge projecting from the opposite side of said plate; and deflecting said second bulge toward said stem projection to cause gripping of the latter by said flange.

2. A nut mounting method according to claim 1 wherein the groove of the nut to be mounted has an annular side wall inclined toward said stem projection for a direction of movement into said groove; and engaging a portion of said second bulge with said inclined side wall to contract said second bulge around said stem projection for grippingly pressing said flange against the latter.

3. The method of mounting a nut, of the kind carrying a stem projection of polygonal shape and surrounded by a groove, on a plate; comprising the steps of moving the nut toward said plate and engaging said stem projection against one side thereof; deflecting the engaged plate portion in one direction out of the plane of said plate; continuing the movement of said nut in the same direction and piercing an opening of corresponding polygonal shape in said engaged plate portion by said stem projection while leaving a flange surrounding the pierced opening and having the sides and corners of the polygonal shape thereon; deflecting the flange-carrying portion of said plate in the opposite direction out of the plane of said plate and into said groove; and deflecting said flange-carrying portion toward said stem projection to cause the polygon-shaped sides and corners of said flange to nonrotatably grip said stem projection.

4. The method of mounting a nut, of the kind carrying a stem projection of polygonal shape and surrounded by a groove, on a plate; comprising the steps of moving the nut toward said plate and engaging said stem projection against one side thereof; deflecting the engaged plate portion into a bulge on the opposite side of the plate; continuing the movement of said nut in the same direction and piercing an opening of corresponding polygonal shape in said bulge centrally thereof by said stem projection while leaving a portion of said bulge as a flange around the pierced opening and having the sides and corners of the polygonal shape thereon; deflecting the flange carrying portion in the opposite direction out of the plane of said plate and into said groove; and contracting said flange-carrying portion around and toward said stem projection to cause the polygon-shaped sides and corners of said flange to nonrotatably grip said stem projection.

5. In a method of mounting a fastener member on a plate member the steps of: providing a fastener member comprising a body having a stem projection on one side thereof and a recess in said one side surrounding said stem projection; providing a plate member having an imperforate area portion on which said fastener member is to be mounted; moving said body toward said plate member and deflecting said area portion out of the plane of said plate member in the direction of such movement by thrust of the end of said stem projection thereagainst; continuing the movement of said body and piercing an opening in the deflected portion centrally thereof by said end so as to leave a flange on said deflected portion surrounding said opening; and deflecting the flange-carrying portion of the plate member in the opposite direction out of the plane of said plate member and into said recess whereby the free edge of said flange is caused to grip said stem projection.

6. In a method of mounting a fastener member on a plate member the steps of: providing a fastener member comprising a body having a stem projection on one side thereof and a recess in said one side surrounding said stem projection; providing a plate member having an imperforate area portion on which said fastener member is to be mounted; supporting said plate member on one side thereof by an annular supporting contact therewith in surrounding relation to said area portion and of larger diameter than the end of said stem projection; moving said body toward said plate member and engaging said end with said area portion on the opposite side of said plate member; continuing the movement of said body and deflecting said area portion out of the plane of said plate member by said end to form a bulge projection on said one side of said plate member; piercing an opening in said bulge projection centrally thereof by said end and leaving an annular portion of said bulge projection as a flange surrounding the pierced opening; and deflecting the annular plate member portion surrounding said flange in the opposite direction out of said plane for moving said flange into said recess and causing the free edge of the flange to contract around and grip said stem projection.

7. In a method of mounting a fastener member on a plate member the steps of: providing a nut member comprising a body having a stem projection on one side thereof and an annnular groove in said one side between said stem projection and an inclined annular wall of said body; bulging an imperforate portion of said plate member into a first bulge projection on one side of said plate member by pressure of the end of said stem projection against the opposite side of the plate member; piercing an opening in said first bulge projection by continued movement of said stem projection and leaving a portion of said first bulge projection as a flange surrounding the pierced opening; bulging an annular portion of said plate member surrounding said opening into a second bulge projection on the opposite side of the plate member; moving said flange into said groove by the second bulging of said plate member; and contracting said flange into gripping engagement with said stem projection by pressing said inclined annular wall against said second bulge projection.

8. The method of making a fastener assembly having a plate member having an aperture and a deflected flange portion surrounding the aperture and a nut member having a stem projection which extends through the aperture and an annular groove surrounding the stem projection in which said flange of said plate member extends to frictionally grip said stem projection comprising the steps of moving the nut toward said plate and engaging said stem against one side thereof; deflecting the engaged plate portion to form a bulge on the opposite side of the plate; continuing the movement of said nut in the same direction and piercing an opening in said bulge centrally thereof by said stem projection while leaving a portion of said bulge as a flange around the pierced opening; deflecting the flange-carrying portion of said plate in the opposite direction and into said groove as a second bulge projecting from the opposite side of said plate; and deflecting said second bulge toward said stem projection to cause gripping of the latter by said flange.

9. The method of making a fastener assembly having a plate member having an aperture and a deflected flange portion surrounding the aperture and a nut member having a stem projection which extends through the aperture and an annular groove surrounding the stem projection in which said flange of said plate member extends to frictionally grip said stem projection comprising the steps of providing a nut member comprising a body having a stem projection on one side thereof and an annular groove in said one side between said stem projection and an inclined annular wall of said body; bulging an imperforate portion of said plate member into a first bulge projection on one side of said plate member by pressure of the end of said stem projection against the opposite side of the plate member; piercing an opening in said first bulge projection by continued movement of said stem projection and leaving a portion of said first bulge projection as a flange surrounding the pierced opening; bulging an annular portion of said plate member surrounding said opening into a second bulge projection on the opposite side of the plate member; moving said flange into said groove by the second bulging of said plate member; and contracting said flange into gripping engagement with said stem projection by pressing said inclined annular wall against said bulge projection.

References Cited

UNITED STATES PATENTS

| 521,825 | 6/1894 | Shipe | 29—432 |
| 2,018,683 | 10/1935 | Meyer et al. | 29—432 |
| 2,433,607 | 12/1947 | Hallock | 29—432 |
| 2,486,769 | 11/1949 | Watson. | |
| 2,707,322 | 5/1955 | Strain et al. | 29—520 X |
| 2,727,659 | 12/1955 | Nyden. | |
| 2,985,342 | 5/1961 | Focht | 29—520 X |
| 3,000,420 | 9/1961 | Spokes | 151—41.73 |
| 3,079,970 | 3/1963 | Barry | 151—41.73 |
| 3,091,843 | 6/1963 | Double et al. | 29—432 |
| 3,108,368 | 10/1963 | Steward | 29—432 |

CHARLIE T. MOON, *Primary Examiner.*

WHITMORE A. WILTZ, *Examiner.*